US 6,674,928 B2

(12) United States Patent
Johnson et al.

(10) Patent No.: US 6,674,928 B2
(45) Date of Patent: Jan. 6, 2004

(54) OPTICAL SENSING DEVICE CONTAINING FIBER BRAGG GRATINGS

(75) Inventors: Gregg A. Johnson, Fairfax, VA (US); Michael D. Todd, Alexandria, VA (US); Bryan L. Althouse, Davidsonville, MD (US); Chia-Chen Chang, Rockville, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 192 days.

(21) Appl. No.: 09/917,643

(22) Filed: Jul. 31, 2001

(65) Prior Publication Data

US 2002/0041722 A1 Apr. 11, 2002

Related U.S. Application Data

(60) Provisional application No. 60/222,293, filed on Aug. 1, 2000.

(51) Int. Cl.⁷ .................................................. G02B 6/00
(52) U.S. Cl. ............................ 385/12; 385/13; 385/14; 385/37
(58) Field of Search ............................ 385/12, 13, 14, 385/37, 10; 356/32, 35.5, 477, 478

(56) References Cited

U.S. PATENT DOCUMENTS

| | | | |
|---|---|---|---|
| 4,649,529 A | 3/1987 | Avicola | |
| 5,118,931 A | 6/1992 | Udd et al. | |
| 5,426,297 A | 6/1995 | Dunphy et al. | |
| 5,477,323 A | 12/1995 | Andrews et al. | |
| 5,513,913 A | 5/1996 | Ball et al. | |
| 5,591,965 A | 1/1997 | Udd | |
| 5,680,489 A | 10/1997 | Kersey | |
| 5,808,779 A | 9/1998 | Weis | |
| 5,818,585 A | 10/1998 | Davis et al. | |
| 5,838,437 A | 11/1998 | Miller et al. | |
| 5,867,258 A | 2/1999 | Frederick et al. | |
| 5,898,517 A | 4/1999 | Weis | |
| 6,072,567 A | 6/2000 | Sapack | |
| 6,115,122 A | 9/2000 | Bao et al. | |
| 6,137,565 A | 10/2000 | Ecke et al. | |
| 6,204,920 B1 | 3/2001 | Ellerbrock et al. | |
| 6,212,306 B1 | 4/2001 | Cooper et al. | |

OTHER PUBLICATIONS

Todd et al, Passive, light intensity–independent interferometric metod for fibre Bragg grating interrogation, Oct. 28, 1999, Electronics Letters, vol. 35 No. 22, pp. 1970–1971.*

* cited by examiner

Primary Examiner—Audrey Chang
Assistant Examiner—Denise S. Allen
(74) Attorney, Agent, or Firm—John J. Karasek; L. George Legg

(57) ABSTRACT

A new optical sensing device containing fiber Bragg gratings, a scanning bandpass filter, an interferometer and multiple photodetectors is disclosed. The present invention also describes a new system and method for fibre Bragg grating (FBG) sensor interrogation and multiplexing. The new system combines a scanning Fabry-Perot (SFP) bandpass filter used to wavelength-multiplex multiple gratings in a single fiber, and an unbalanced Mach-Zehnder fibre interferometer made with a 3×3 coupler to detect strain-induced wavelength shifts. A passive technique for interferometer drift compensation using non-sensing FBGs is included in the system. A complete prototype system interrogates four gratings in a single fiber at a Nyquist sampling rate up to 10 kHz, with a noise floor measured near 4 nε $Hz^{-1/2}$ above 0.1 Hz. The inclusion of the interferometer drift compensation technique is shown to make quasi-static measurements feasible.

25 Claims, 6 Drawing Sheets

OPTICAL SENSING DEVICE CONTAINING FIBER BRAGG GRATINGS

This application claims the benefit of provisional application No. 60/222,293 filed Aug. 1, 2000.

BACKGROUND OF THE INVENTION

1. Field of the Invention

The present invention relates to an optical sensing device which employs fiber Bragg grating and includes both a scanning filter and an interferometer which together function as the interrogation and multiplexing system of the sensing device.

2. Description of the Prior Art

The introduction of fiber Bragg gratings (FBG's) and the development of subsequent techniques with which to mass-produce them has spurred significant research activity in the development of FBG-based sensors and interrogation systems that detect shifts in the center wavelengths of the gratings. The wavelength shifts are caused by axial strains exerted on the fiber in which the gratings are written. This has led to widespread application of gratings in strain gauges (Kersey et al, J. Lightwave Tech., 15, 1442–63,1997; Vohra et al, IEICE Trans. Electron., E83-C, 454–61,2000; Maaskant et al, Cement Concrete Composites, 19, 21–3, 1996; Todd et al, Proc. Int. Modal Analysis Conf. XVIII, San Antonio, Tex., 2000) or, when provided with appropriate transducers, as sensors for other measurands such as acceleration (Todd et al, Photon Technol. Lett., 10, 1605–7,1998), soil pressure (Chang et al, Proc. 14th Int. Conf. on Optical Fiber Sensors, Venice, 2000) and oil well gas pressure (Yamate et al, Proc. 14th Int. Conf. on Optical Fiber Sensors, Venice, 2000). Since several FBG's can be written into a single fibre, ease of multiplexing as well as an immunity to electromagnetic interference are important features that FBG-based devices offer.

The current state of the art in wavelength shift detection systems is based primarily on variations of four designs: scanning Fabry-Perot (SFP) filter-based interrogation (Kersey et al, Opt. Lett., 18, 1370–2, 1993), tunable acousto-optic filter interrogation (Geiger et al, Electron. Lett. 31, 1006–7, 1995), wavelength division-multiplexed (WDM) interferometric interrogation (Kersey et al, Electron. Lett. 28, 236–7, 1992) and prism/CCD-array techniques (Askins et al, Smart Sensing, Processing and Instrumentation, Proc. SPIE 2444, 257–61, 1995).

The tunable filter techniques (SFP and acousto-optic) use a broadband source and broadband detectors to interrogate multiple FBG's in series in single array by tuning the filter such that a single grating is illuminated at any given time within the optical bandwidth of the source. A control voltage applied to the SFP filter (or a control frequency applied to the acousto-optic filter) is used to track the reflection peaks of each grating. In the case of the SFP filter, the relationship between the control voltage and the passband wavelength of the SFP filter is not a linear one, and thus curve-fitting calibration techniques must be employed.

The WDM interferometer and CCD-array techniques use a broadband source and broadband detectors in conjunction with wavelength discrimination components to interrogate multiple gratings simultaneously. For the WDM system, the gratings must be centered within the passbands of the WDM filters. Accordingly, large wavelength shifts which place the gratings outside the filter bandwidths cannot be tolerated. For this reason, and because very low-frequency interrogation of the interferometer is difficult due to inherent drift destabilization, the WDM system is often used for high-frequency, low-amplitude measurements. The CCD-array system is much more flexible in its multiplexing capability and can simultaneously sample multiple gratings without confining wavelength shifts to discrete bands. From a system performance perspective, the SFP filter systems tend to have a low sample rate (<1 kHz) due to limitations in the required electronics and a dynamic noise floor of roughly 100 $n\epsilon Hz^{-1/2}$, while the interferometer-based systems may have a measurement bandwidth up to tens of kilohertz and a noise floor of 5–10 $n\epsilon Hz^{-1/2}$ at 100 Hz, with a rapidly rising noise floor approaching the static end of the frequency spectrum due to active component requirements. Despite lesser bandwidth and sensitivity, the scanning filter designs are frequently employed because of the ease with which both static and quasi-static measurements may be made and because of the ease with which the multiplexing of several gratings (>10) on a single fiber strand may be achieved.

It is an objective of certain embodiments of the present invention to provide a fiber Bragg grating sensor interrogation system that combines the ease-of-multiplexing capability of an SFP filter-based system and the high-resolution capability of an interferometer-based system.

It is another objective of certain embodiments of the present invention to provide a fiber Bragg grating sensor interrogation system that surpasses the dynamic range of both an SFP filter system and an interferometer-based system and which exceeds the bandwidth limitations of the SFP filter system.

It is a further objective of certain embodiments of the present invention to provide a fiber Bragg grating-based sensing device, which employs a passive technique by utilizing a fiber Bragg grating-based wavelength reference device in order to compensate for interferometer drift and thermal variation in its fiber Bragg gratings such that quasi-static strain measurements can be made.

It is still a further objective of certain embodiments of the present invention to provide a demodulator used in a fiber Bragg grating-based sensor device, which can provide a substantially accurate measurement even when the intensity of the light source, or the decay of the couplers, filters or interferometer in the device is unstable.

It is still a further objective of certain embodiments of the present invention to provide a fiber Bragg grating-based sensing device which has a high resolution, is easy to multiplex, allows use of a large bandwidth, and has a high tolerance for fluctuations in the intensity of its light source and for changes in environmental factors such as temperature.

SUMMARY OF THE INVENTION

In a first aspect, the present invention relates to a device for measuring a change in an environment. The device first includes an optical fiber having a plurality of fiber Bragg gratings. Each of the fiber Bragg gratings has a predetermined reflection wavelength. The device further includes a broadband light source optically coupled to the optical fiber; and a scanning filter. The scanning filter is optically coupled to the optical fiber. The device further includes an interferometer optically coupled to the scanning filter; a first photodetector generating a first output, wherein the first photodetector is optically coupled to the interferometer; a second photodetector generating a second output, wherein the second photodetector is optically coupled to the interferometer; and a third photodetector generating a third output, wherein the third photodetector is optically coupled to the interferometer.

In a second aspect, the present invention relates to an interrogating system for a fiber optical sensor having fiber Bragg gratings. The interrogating system includes a scanning filter optically coupled to a fiber optical sensor; an interferometer optically coupled to the scanning filter; a first photodetector optically coupled to the interferometer; a second photodetector optically coupled to the interferometer; and a third photodetector optically coupled to the interferometer.

In a third aspect, the present invention relates to a method for measuring a change in an environment. The method for measuring the change in the environment includes the steps of: a) illuminating a fiber having a plurality of fiber Bragg gratings with different center wavelengths with a broadband light to generate a reflected light from each of the Bragg gratings, wherein each reflected light is reflected from a specific fiber Bragg grating and has a wavelength which is the sum of the center wavelength characteristic of the specific fiber Bragg grating and a wavelength shift characteristic of one or more changes in the environment; b) filtering each reflected light based on its wavelength; c) encoding the wavelength of the each reflected light which has been filtered into a phase signal embedded in at least three interference lights; d) converting each of the at least three interference lights into voltages; e) demodulating the voltages signals to obtain the phase of the phase signal; and f) calculating the wavelength shift of each reflected light from the phase of the phase signal; and g) determining a change in the environment from said wavelength shift.

In a fourth aspect, the present invention relates to a demodulator for processing outputs from an interrogation system which may be used in an optical sensing device having fiber Bragg gratings. The demodulator includes: a) means for determining the tangent of a phase of a phase signal using the outputs from the interrogation system; b) means for determining an arctangent of the tangent of the phase of the phase signal; and c) means for phase-unwrapping the determined arctangent.

In a fifth aspect, the present invention relates to a method for processing outputs from an interrogation system which may be used in an optical sensing device having fiber Bragg gratings. The method includes the steps of: a) determining the tangent of a phase of a phase signal using the outputs from the interrogating system; b) determining an arctangent of the tangent of the phase of the phase signal; and c) phase-unwrapping the determined arctangent.

DETAILED DESCRIPTION OF THE PREFERRED EMBODIMENTS

In a first aspect, the present invention relates to a device for measuring a change in an environment. The device includes a first optical fiber having and a plurality of fiber Bragg gratings. Each of the fiber Bragg gratings has a predetermined reflection wavelength. The device further includes a broadband light source optically coupled to the optical fiber; and a scanning filter. The scanning filter is optically coupled to the optical fiber. The device further includes an interferometer optically coupled to the scanning filter; a first photodetector generating a first output, wherein the first photodetector is optically coupled to the interferometer; a second photodetector generating a second output, wherein the second photodetector is optically coupled to the interferometer; and a third photodetector generating a third output, wherein the third photodetector is optically coupled to the interferometer.

Figure 1A:
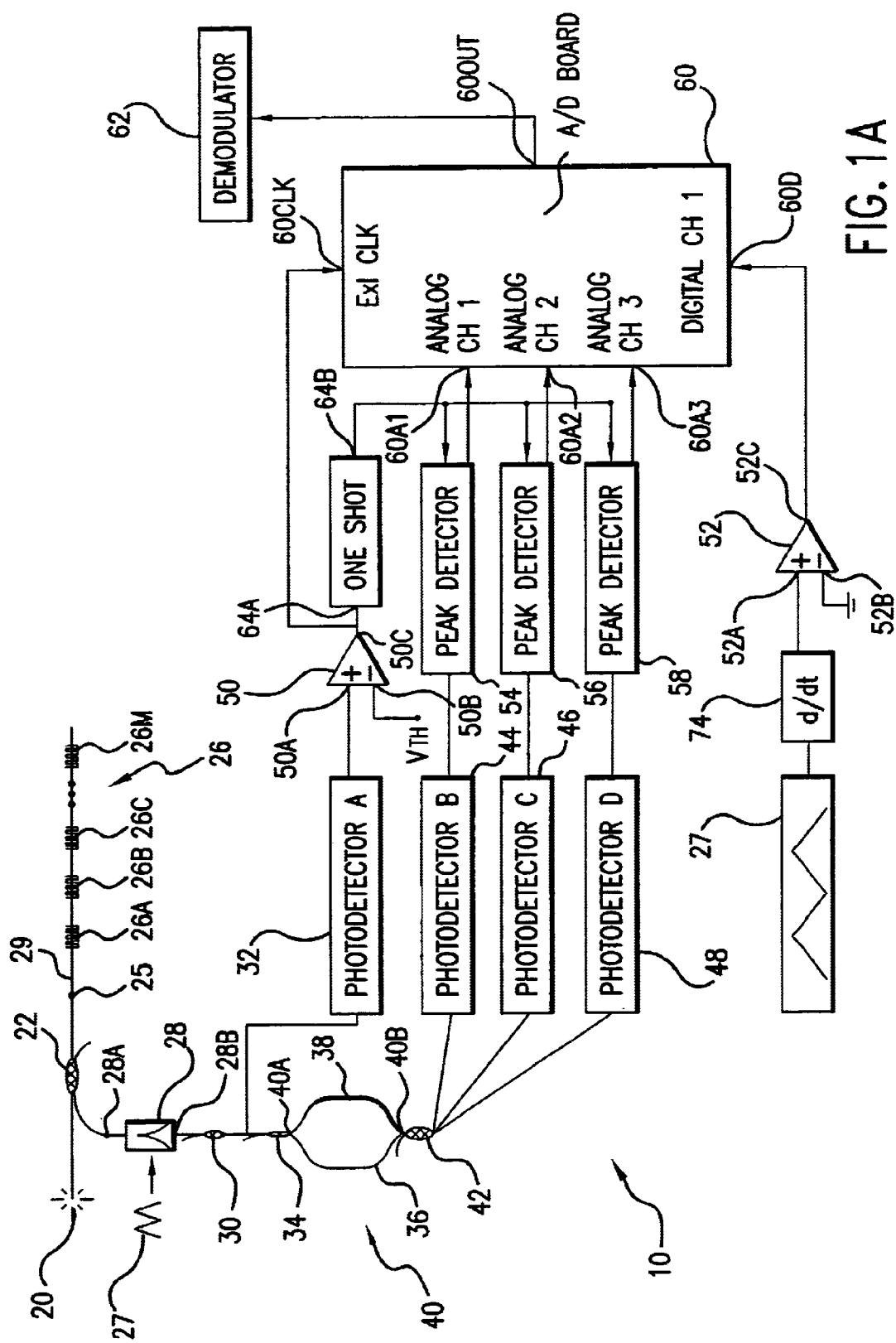
FIG. 1A is a schematic diagram of a first embodiment of a device according to the present invention for measuring a change or perturbation in an object or an environment.

Now referring to FIG. 1A, which illustrates one embodiment of a device of the present invention for measuring a change in an environment, a device 10 for measuring a change in an environment or an object of the present invention includes a broadband light source 20, a fiber 29 having a plurality of fiber Bragg gratings 26A, 26B, 26C, . . . , 26M, a scanning filter 28, an interferometer 40, photodetectors 44, 46 and 48, and demodulator 62. Each of the fiber Bragg gratings 26A, 26B, 26C, . . . , 26M has a different predetermined reflecting wavelength λa, λb, λc, . . . , λm all of which are preferably different from one another. The plurality of fiber Bragg gratings 26A, 26B, 26C, . . . , 26M are in contact with the object or the environment whose dimensions, properties, physical state, or other characteristics change over time. The measurement of change in dimensions (strains), physical state or other characters are one of the purposes of the device of the invention. Broadband light source 20 is optically coupled to end 25 of fiber 29 via a coupler 22 so that light from light source 20 can pass through fiber 29 and irradiate fiber Bragg gratings 26A, 26B, 26C, . . . , 26M. Upon being irradiated, each fiber Bragg grating reflects light having a wavelength close to its predetermined center wavelength with the difference between the actual wavelength of the reflected light and the predetermined center wavelength of the grating being dependent on the change in the object or the environment being measured.

Scanning filter 28 has an input port 28A and an output port 28B. Input port 28A of scanning filter 28 is preferably optically coupled to end 25 of fiber 29, at which broadband light source 20 is coupled to fiber 29, via coupler 22. Output port 28B of scanning filter 28 may be directly optically coupled to the input port 40A of interferometer 40 via a coupler 34. Optionally, output port 28B may be optically coupled to coupler 30 first before coupler 30 is coupled to coupler 34, which is further optically coupled to the input port 40A of interferometer 40. Optionally, coupler 30 is also a splitter, which splits part of the signal, preferably 10% of the signal from output port 28B to a photodetector 32 optically coupled to coupler 30. The output port 40B of interferometer 40 is coupled to photodetectors 44, 46 and 48 via a coupler 42.

The reflected lights, each having a unique wavelength $\lambda a$, $\lambda b$, $\lambda c$, . . . , or $\lambda m$, from fiber Bragg gratings 26A, 26B, 26C, . . . , 26M pass through fiber 29 and coupler 22 to scanning filter 28. The passband of scanning filter 28 is regulated by a scanning triangular wave voltage 27 so that only one reflected light having a unique wavelength passes through scanning filter 28 at any given time. The reflected light having the unique wavelength then passes through coupler 34 (optionally, through coupler 30 as well) to interferometer 40, which contains two arms (optical paths) 36 and 38. The reflected light passes through both arms 36 and 38 and reaches the output port 40B of interferometer 40, which encodes the wavelength of the light into a phase signal embedded in interference lights which are transmitted through coupler 42. Coupler 42 splits the interference light into three lights containing the phase signal and transmits the three split interference lights to photodetectors 44, 46 and 48. Upon receiving the split interference lights from coupler 42, photodetectors 44, 46 and 48 generate three electrical signals, which have peak voltages $V_{44}$, $V_{46}$, and $V_{48}$, respectively. The three electrical signals may be directly transmitted to demodulator 62 to be processed. Demodulator 62 demodulates the phase of the phase signal embedded in the three electrical signals and may further determine the wavelength shift caused by a change in the environment based on the phase of the phase signal. The wavelength shift may then be correlated to an environmental change to produce the desired measurement.

Preferably, the three electrical signals are first sent to three peak detectors 54, 56 and 58, which are connected to the output side of photodetector 44, 46, and 48 respectively. In these peak detectors 54, 56 and 58, the peak voltages of the electrical signals are measured and the results are sent out to an A/D board 60, whose analog input ports 60A1, 60A2 and 60A3 are connected to the outputs of peak detector 54, 56 and 58. The A/D board 60 further digitalizes and transmits the peak voltage results through its output port 60OUT to demodulator 62, which demodulates the phase of the phase signal embedded in the three electrical signals and may further determine a change in the environment based on the phase of the phase signal.

Preferably, photodetector 32 has an output which is connected to the positive input 50A of a comparator 50. The output 50C of comparator 50 is connected both to the input port 64A of one shot circuit 64 and to the clock port 60CLK of A/D board 60. The negative port 50B of comparator 50 is connected to a predetermined constant voltage $V_{TH}$.

Preferably, device 10 of the present invention further includes a differentiator 74. The triangular wave voltage 27 is input to the differentiator 74 to cause it to generate a rectangular wave which is sent to the positive port 52A of comparator 52. The negative port 52B of comparator 52 is grounded. The output port 52C of comparator 52 is connected to the digital channel 60D of A/D board 60.

Preferably, scanning filter 28 is selected from the group consisting of a tunable Fabry-Perot filter, and a tunable acousto-optical filter. Alternatively, scanning filter 28 can be omitted in device 10 of the present invention when broadband light source 20 is a tunable broadband light source. More preferably, scanning filter 28 is a tunable Fabry-Perot filter, which may be controlled by a triangular voltage wave 27.

Preferably, interferometer 40 is an unbalanced Mach-Zehnder fiber interferometer. More preferably, interferometer 40 includes two arms (optical paths) 36 and 38, wherein the optical length of arm 36 is different from the optical length of arm 38. The difference in optical length between arms 36 and 38 can be adjusted to suit a particular measurement need.

Preferably, coupler 30 is a 90/10 splitter. Preferably, coupler 34 is at least a 2×2 coupler. More preferably, coupler 34 is a 2×2 coupler.

Preferably, coupler 42 is at least a 3×3 coupler. More preferably, coupler is a 3×3 coupler.

In a second aspect, the present invention relates to an interrogation system for an optical sensor having fiber Bragg gratings.

Referring to FIG. 1A, a preferred embodiment of the interrogation system of the present invention includes scanning filter 28 having an input port 28A and an output port 28B, wherein the input port 28A of the scanning filter 28 is optically coupled to the optical sensor fiber 29; an interferometer 40 having an input port 40A and an output port 40B. The input port 40A of the interferometer 40 is optically coupled to the output port 28B of the scanning filter 28 through two couplers 30 and 34, which are optically coupled in series between themselves. A first photodetector 44, a second photodetector 46 and a third photodetector 48 are optically coupled to the output port 40B of the interferometer 40 via a coupler 42.

In a third aspect, the present invention relates to a method for measuring a change in an environment.

Referring to FIG. 1A, a preferred embodiment of the method for measuring the change in the environment of the present invention involves the process described below. The broadband light source 20 emits a broadband light and irradiates an optical fiber 29, which has a plurality of fiber Bragg gratings 26A, 26B, 26C, . . . , 26M. Each of the fiber Bragg gratings 26A, 26B, 26C, . . . , 26M preferably has its own unique center wavelength and generates a reflected light with a wavelength which is the sum of its unique center wavelength and a wavelength shift based on a change or perturbation in the environment or object associated with the optical fiber 29.

The reflected lights from each of the fiber Bragg gratings pass through coupler 22 and input port 28A and reach scanning filter 28. Scanning filter 28 filters reflected lights based on their wavelengths so that only a single reflected light with a single wavelength passes through the scanning filter 28 at a time. The wavelength of the single reflected light passing through filter 28 is controlled by a triangular voltage wave 27 applied to the scanning filter 28. The triangular voltage wave 27 causes the scanning filter 28 to scan the entire bandwidth of the filter 28 during each cycle of the triangular voltage wave 27 so that reflected lights pass through the scanning filter 28 one by one during each cycle of the triangular voltage wave 27. At a given moment, the single reflected light passing through the scanning filter 28 reaches the input port 40A of interferometer 40 through couplers 30 and 34.

The single filtered, reflected light travels through both arms 36 and 38 after entering interferometer 40 and splits into two lights. The two split lights interfere at output 40B or coupler 42 to generate three interference lights after passing through coupler 42. At this moment, the wavelength information of the single reflected light is encoded in a phase signal which is embedded in the interference lights. The three interference lights have a proper phase relationship among themselves due to the configuration of coupler 42. The three interference lights also have a proper phase-intensity character due to the preselected optical length difference between the two arms 36 and 38 of interferometer 40 and the wavelength of the single reflected light passing through the scanning filter 28. Each of the three interference lights is transmitted to photodetectors 44, 46 or 48 respectively. Photodetectors 44, 46 and 48 convert the three interference lights into three electrical signals, which can be directly passed on to the demodulator 62. Demodulator 62 demodulates the phase of the phase signal embedded in the three electrical signals and may further compute a change or perturbation in the environment or object based on the phase of the phase signal. Alternatively, the three electrical signals are sent to three peak detectors 54, 56 and 58 respectively, which measure the peak voltage of each electrical signal and send the voltage results to an A/D board 60. The A/D board 60 further digitalizes and passes the peak voltage results through its output port 60OUT to demodulator 62, which demodulates the phase of the phase signal embedded in the three voltage results and may further compute a change or perturbation in the environment or object based on the phase of the phase signal.

In a fourth aspect, the present invention relates to a demodulator for processing outputs from an interrogation system for a fiber optical sensor having fiber Bragg gratings. The demodulator includes: a) means for determining the tangent of a phase of a phase signal using the outputs from the interrogating system; b) means for determining an arctangent of the tangent of the phase of the phase signal; and c) means for phase-unwrapping the arctangent.

Figure 1B:
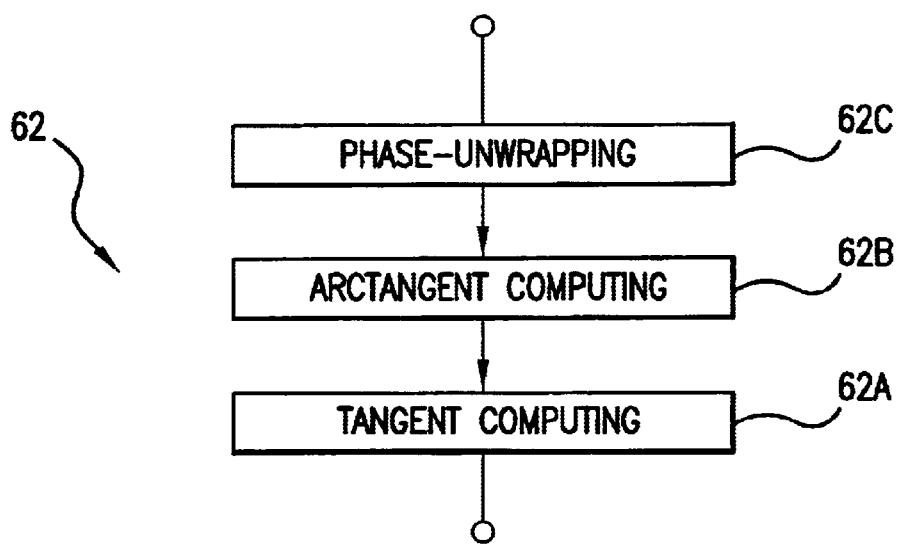
FIG. 1B is a schematic diagram of a first embodiment of a demodulator for determining the phase of a phase signal using the output from an interferometer according to the present invention.

Referring now to FIG. 1B, an embodiment of the demodulator of the present invention includes: a) a tangent-determining unit 62A, which is encoded with a tangent algorithm to determine the tangent of a phase of a phase signal using the outputs from the photodetectors 44, 46 and 48 or outputs containing peak voltages signals from A/D board 60 (FIG. 1A); b) an arctangent-determining unit 62B which is encoded with an arctangent algorithm to determine the arctangent of the tangent of the phase of the phase signal outputted from tangent computing unit 62A; and c) a phase-unwrapping unit 62C, which takes the arctangent results from arctangent-determining unit 62B and unwraps the phase to get the real value of the phase.

Preferably, units 62A, 62B and 62C are selected from the group consisting of programmable chips encoding the proper computation algorithms, integrated circuit circuits encoding the proper computation algorithms and a computer encoding the proper computation algorithms. More preferably, units 62A, 62B and 62C reside on one programmable chip which encodes all three computation algorithms including tangent computing, arctangent computing and phase-unwrapping.

In a fifth aspect, the present invention relates to a method for processing outputs from an interrogation system for an optical sensor having fiber Bragg gratings.

Referring now to FIG. 1B, one embodiment of the method of the present invention includes the steps of: a) determining a tangent of a phase of a phase signal using the outputs from the interrogation system using tangent determining unit 62A; b) determining an arctangent of the tangent of the phase of the phase signal using an arctangent-determining unit 62B; and c) phase-unwrapping the arctangent to obtain the phase using phase-unwrapping unit 62C.

In a more preferred embodiment of a device 310 (shown in FIG. 1C) for measuring a change in an environment of the present invention, an array of m FBGs 326A, 326B, . . . , 326M with their center wavelengths being $\lambda$a, . . . , $\lambda$m is illuminated with a broadband source in the 1550 nm regime. A typical bandwidth obtained using broadband sources, such as diode sources, used in this more preferred embodiment is about 40 nm. Each grating is preferably manufactured to reflect within the 40 nm source band, with application-specific wavelength shift ranges considered for appropriate dynamic range and minimum grating separation requirements. Typically, such considerations allow between 10 and 20 gratings to be placed on a single fiber 329. Lights reflected from the FBG sensor array 326 are coupled back through an SFP filter 328, which passes only a narrowband light wavelength that is dependent upon the spacing between mirrors in the SFP filter 328. This spacing, and thus the passband, is controlled by applying a stepped triangle-wave voltage 327 to a piezoelectric device driving the mirrors. The SFP filter 328 used in this work has a passband width of about 0.25 nm, and since FBG's 326A, 326B, . . . , 326M have a reflection bandwidth of about 0.1–0.2 nm only one grating reflection will pass through the SFP filter 328 at a given time. Use of the SFP filter 328 in this way serves to demultiplex the individual grating signals in the m-component sensor array 326.

As the SFP filter 328 passband passes a given FBG reflection peak, 90% of the light is transmitted to an unbalanced Mach-Zehnder interferometer 340 (2.75 mm imbalance, the optical length difference between two arms 336 and 338), and 10% is transmitted directly to a photodetector 332. The interferometer converts the reflected wavelength to a phase signal having a phase difference (a phase) across it according to the general relationship $$\phi = \frac{2\pi nd}{\lambda} + \phi_{env} \tag{1}$$

where $\phi$ is the phase difference, $\lambda$ is the peak reflection wavelength of the grating, n is the refractive index of the fibre core, d is the difference in length between the interferometer paths (path imbalance) and $\phi_{env}$ is a term added to indicate the presence of slowly varying, environmentally-induced random phase shifts due to variations in n and d , which typically arise from temperature fluctuations occurring at very slowtime scales. Light passing through the interferometer is then sent through a 3×3 coupler, where a phase offset of 120° (2/3 $\pi$rad) is induced between the three outputs, and finally the light from the three coupler outputs is sent to photodetectors 344, 346 and 348 for conversion to voltages.

Figure 1C:
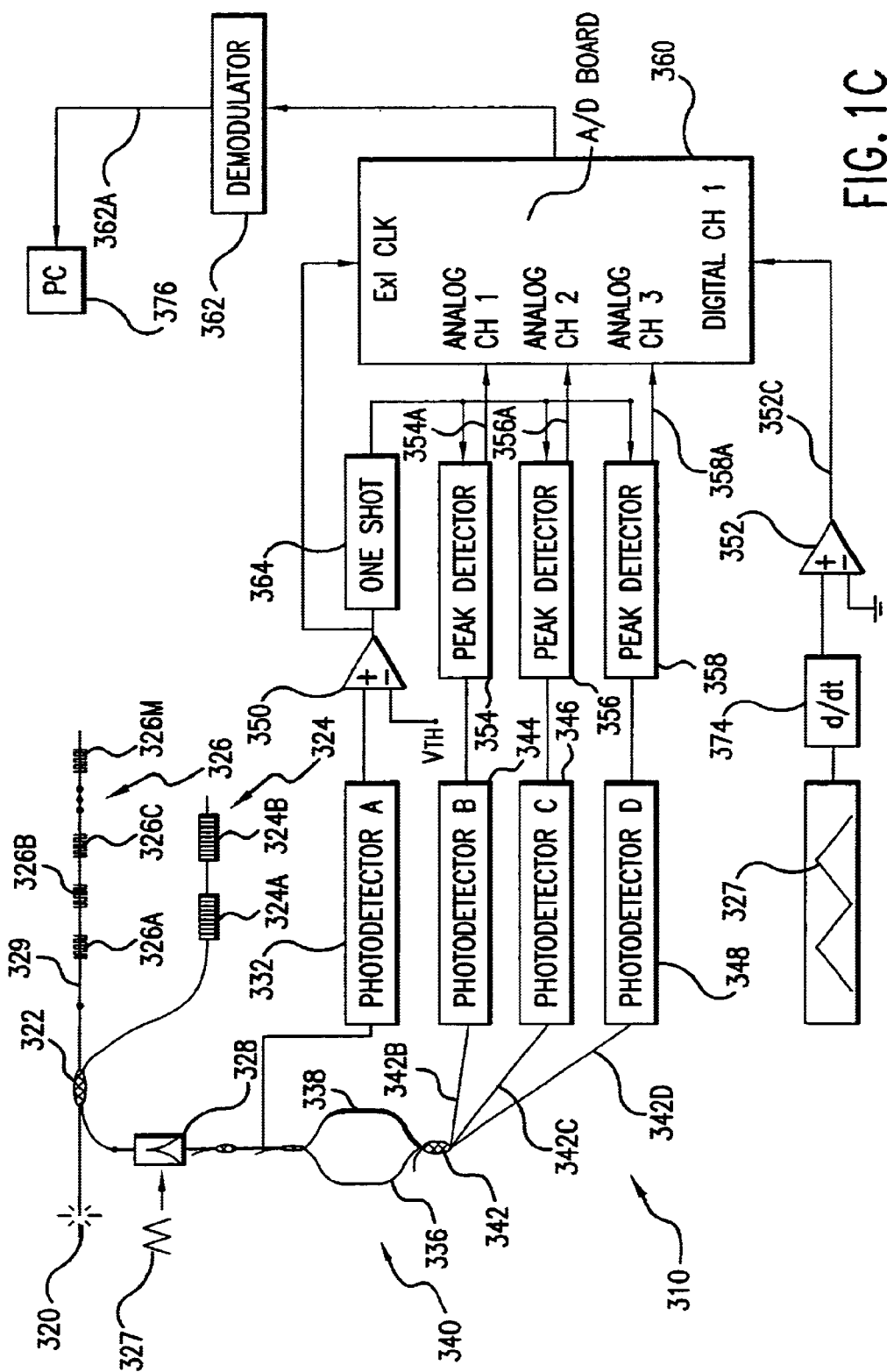
FIG. 1C is a schematic diagram of a preferred embodiment of a device according to the present invention for measuring a change or perturbation in an object or an environment.

One potentially corrupting feature of interferometric measurements is the drift of the interferometer 340, globally represented by the $\phi_{env}$ term in equation (1). Tracking of this drift is crucial for allowance of static to quasi-static measurements of FBG phase shift. As shown in FIG. 1C, light emitted from the source is sent to a 2×2 coupler 322, and the outputs of that coupler 322 transfer light to both the sensing array 326, as described, and also to a simple FBG wavelength reference system 324 (Johnson et al, Structural Health Monitoring, edited by Chang, Technomic, Lancaster, Pa., 2000). The reference system consists of two gratings 324A and 324B in a sealed package, one bonded to a glass strip (324A having a center wavelength of $\lambda_G$) and the other to an aluminum strip (324B having a center wavelength of $\lambda_{Al}$). These gratings 324A and 324B are sensitive only to thermally-induced wavelength shifts, so the changes in phase of the FBGs 324A and 324B in this reference device may be directly calculated:

$$\Delta\phi_G=\Delta\phi_{env}+\gamma_G\Delta T \Delta\phi_{Al}=\Delta\phi_{env}+\gamma_{Al}\Delta T \quad (2)$$

where $\gamma_G$ and $\gamma_{Al}$ are the material thermal expansion coefficients and $\Delta T$ is the temperature change. Two equations with two unknowns ($\Delta T$ and $\Delta\phi_{env}$) allow for robust tracking of the interferometer 340. On the unit circle, the reference FBG system 324 phase changes, as described in equation (2), may be interpreted in this way: if the interferometer 340 is drifting and the temperature is steady, then $\phi_{env}$ is changing, and the two FBG (324A and 324B) phases will move together around the circle at a constant angle of separation. If, however, the interferometer 340 is stable but the temperature is changing, the phases will move in such a way that their relative phase will change, in proportion to the difference of the aluminum and glass thermal expansion coefficients.

The interferometer drift is calculated at each sample acquisition and subtracted from the measured phase of the FBG sensor array 326. The reference system 324 is interrogated serially with the sensor array 326, but since little phase shift (and thus little wavelength shift) is associated with the reference system 324, the FBGs 324A and 324B may be written with closely-spaced reflection wavelengths and placed at one far extreme in the SFP filter 328 scan band. In this way, the reference system 324 costs a negligible penalty in the dynamic range of the sensor array 326. Further gains in interferometer drift minimization may also be achieved by keeping the optical path difference between arms 336 and 338 as small as possible without sacrificing too much sensitivity.

Figure 2:
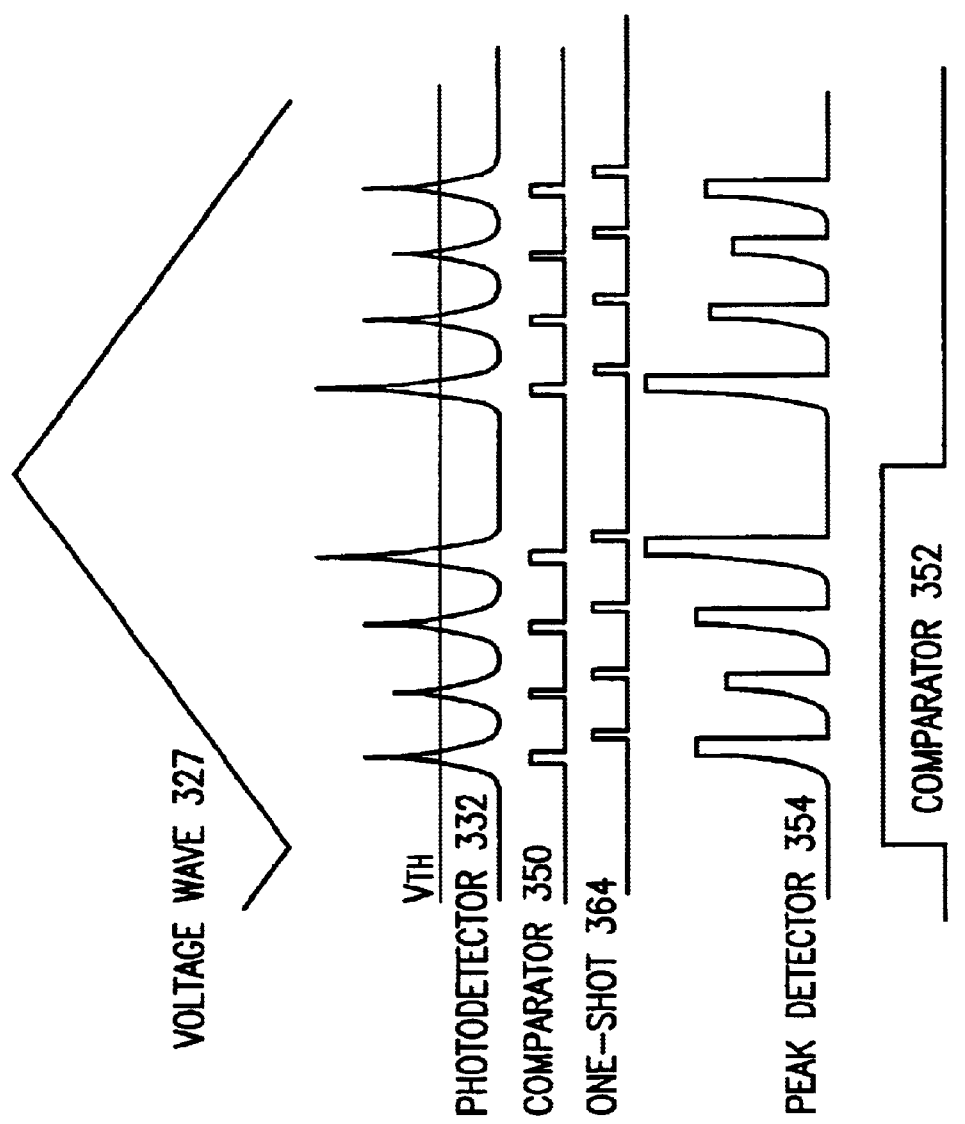
FIG. 2 is a typical electronic timing diagram as a series of four Bragg gratings is encountered during the scanning of a scanning filter in a preferred embodiment of the present invention. The peak detector output voltages (only one is shown here) are the Vn of equation (3).

A typical timing diagram depicting what is occurring in the electronic processing of the three photodetector (344, 346 and 348) voltages, is shown in FIG. 2, where it is assumed that four separate FBG's 326A, 326B, . . . , 326M are being interrogated (M=4). The light sent to photodetector 332 is used to determine when a grating is being detected. The photodetector 332 voltage output shows a local maximum at the grating's passage through the SFP filter 328, and a comparator 350 creates a high logic when a certain amount of light (manually set by $V_{TH}$) is present. The trailing edge of comparator 350, indicating that the SFP filter 328 has now passed the full FBG reflection peak, triggers the following event cascade: first, peak detectors 354, 356 and 358 hold the peak voltages 344A, 346A and 348A encountered at photodetectors 344, 346 and 348 on the output 342B, 342C and 342D of the 3×3 coupler 342 respectively. Next, the data acquisition board 360 is configured to sample those held peak voltages 354A, 356A and 358A. Finally, after a slight delay is added to allow for full sampling by the board 360, a one-shot circuit 364 is triggered, which is used to reset the peak detectors 354, 356 and 358 voltage levels to zero. The peak detectors 354, 356 and 358 are now prepared to process the next grating. A triangle-wave voltage 327 is used to drive the SFP filter 328, and this signal is differentiated by differentiator 374 to produce a square-wave which is converted to standard logic with comparator 352. The output 352C of comparator 352 is used to determine whether the scanning voltage 27 of scanning filter 28 is increasing or decreasing, and thus to determine the beginning of a new interrogation cycle.

In summary, comparator 350 is driven high when $V_{TH}$ is exceeded, indicating that a grating is being encountered. The falling edge of comparator 350 triggers the one-shot 364, which is used to reset the voltages at the peak detectors 354, 356 and 358, with the appropriate delay built in to allow proper A/D conversion by the sampling board 360. The output of comparator 352, which inputs the derivative of triangular wave voltage 327, which is used to drive the scanning filter 328, is used to determine the onset and conclusion of the interrogation of the sensor array 326 for a given time step.

The phase measurement encoding the FBG strain information is performed using all three photodetectors 344, 346 and 348 to detect outputs 342B, 342C and 342D of the 3×3 coupler 342. The three photodetector voltages $V_n$ (n∈{1 2 3}={344, 346, 348}), where the outputs will be arbitrarily phase-referenced to photodetector 344, may be expressed as:

$$V_n=K_n+G_n\cos(\phi+2\pi(n-1)/3) \quad (3)$$

where K is the nominal Bragg reflection intensity, G is the modulation depth of the interferometer 340, and $\phi$ is the phase signal of interest. It may be shown through standard trigonometric relationships that:

$$\tan\phi = \frac{\sqrt{3}(\alpha_3 V_2 - \alpha_2 V_3)}{(\alpha_3 V_2 + \alpha_2 V_3 - 2\alpha_2\alpha_3 V_1)} \quad (4)$$

where $\alpha_n=G_n/G_1=K_n/K_1$. Source intensity or polarization-induced fluctuations may cause individual $K_n$ and $G_n$ to vary, but in the same proportion in each detector; thus, the $\alpha_n$ may be obtained a priori by applying a known-sized signal to the system.

Equation (4) allows for robust recovery of $\phi$ by using an arctangent algorithm with appropriate phase unwrapping for signals exceeding $2\pi$ in amplitude. The general form of this algorithm is as follows: the values $\tan\phi$ and $-\cot\phi$ are obtained by equation (4) and its negative reciprocal. The arctangent function is then applied to one of these values on the $|\tan\phi|$; if $|\tan\phi|<1(\phi<\pi/4)$, then $\arctan(\tan\phi)$ is computed, else $\arctan(\cot\phi)$ is computed. This calculation allows for complete continuous coverage of the unit circle. For unwrapping, a series of Boolean tags is associated with each phase computation, and increments of $\pm 2\pi$ are added to the current phase computation by both comparing past and present Boolean values and past and present information pertaining to the quadrant of the phase computation. The entire demodulation algorithm including the unwrapping algorithm is incorporated directly into a programmable logic chip 362. The output 362A of the programmable chip 362 is sent to a computer 376 for further data processing and storage. Optionally, the entire demodulation process can be realized in computer 376 containing a program encoding the demodulation algorithm. Therefore, the demodulator may be included in computer 376. Once the phase shift f is recovered, the resulting strain on the grating may be calculated by the relationship:

$$\Delta \varepsilon = \frac{\lambda}{2\pi n d \zeta} \Delta \phi \quad (5)$$

which is obtained by differentiating equation (4) with respect to λ, and by utilizing the FBG photoelastic relationship:

$$\Delta \lambda = \zeta \lambda \Delta \varepsilon \quad (6)$$

where the photoelastic constant $\zeta \approx 0.78$.

This method of obtaining φ (demodulation) offers some advantages over previous methods of 3×3 demodulation (Koo et al, Appl. Phys. Lett. 40, 616–18, 1982; Lo et al, J. Lightwave Tech., 15, 1578–86, 1997; Lo, Photon. Technol. Lett., 10, 1003–5, 1998). The method of the present invention is completely passive, and as such no active devices are present which may limit bandwidth or dynamic range. The method of the present invention is immune to source or polarization-induced intensity fluctuations in the sense that such fluctuations will not be falsely interpreted as strain.

In order to demonstrate the characteristics of the device 310 described above, a prototype was built with an interferometer 340 with path imbalance of 2.75 mm, four FBG's, a Queensgate SFP filter as filter 328, a National Instruments data acquisition board as board 360 with a 500 kHz sampling rate capability and a broadband optical source 320 centered near 1550 nm. The SFP filter 328 was driven as fast as 10 kHz, resulting in a true Nyquist rate of 10 kHz, since the gratings (326A, ..., 326M) are sampled on both the up and down cycles of the filter drive ramp.

Figure 5:
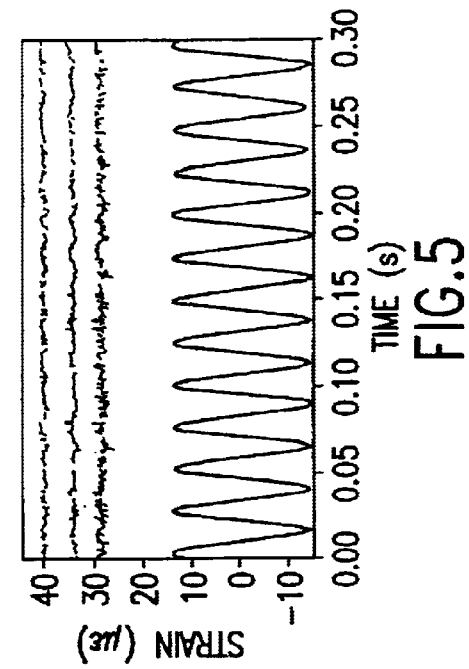
FIG. 5 demonstrates the cross-talk minimization effect of a sensing device according to present invention, wherein a small-amplitude signal placed on only one FBG is not observed in the other FBG's. The channels are intentionally shifted for visual clarity.
Figure 3:
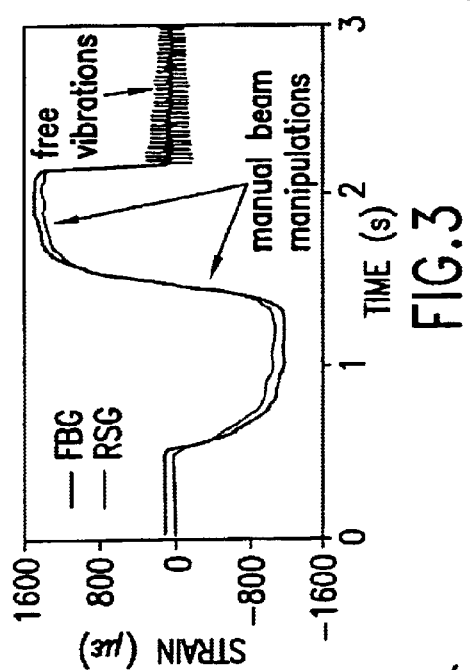
FIG. 3 shows a comparison of the strain responses of a fiber Bragg grating and a conventional resistive strain gauge collocated on a loaded aluminum cantilever beam. The resistive strain gauge trace has been intentionally shifted for visual clarity.
Figure 4:
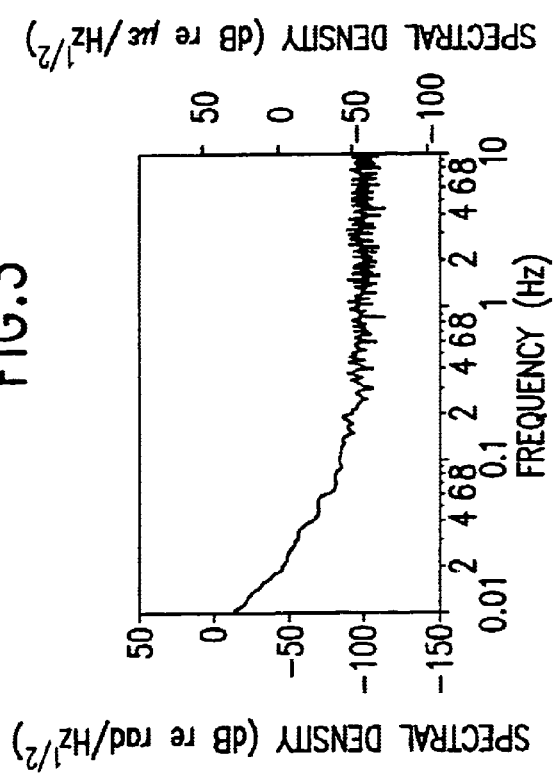
FIG. 4 shows the typical low-frequency noise floor of an optical sensing device according to the present invention.

As a first test, one of the gratings (FBG) was mounted on a cantilever beam in a collocated manner with a conventional resistive strain gauge (RSG), and the simultaneous responses of the fiber Bragg grating (FBG) and resistive strain gauge (RSG) as the beam was loaded are shown in FIG. 3. An artificial 100με offset was applied to the resistive gauge trace in order to distinguish the responses as the beam was manually bent and sent into free vibrations. Clearly, the FBG response, from an accuracy point of view, is indistinguishable from the resistive gauge. The noise floor of the system was measured in situ in the laboratory without any acoustic or thermal isolation of the interferometer 340, and the results are shown in FIG. 4. Above about 0.1 Hz, a noise floor of about −90 dB rad $Hz^{-1/2}$ (31 μrad $Hz^{-1/2}$) is demonstrated, which, for the interferometer 340 used, is about 4 nε $Hz^{-1/2}$. Such strain resolution capability exceeds by several orders of magnitude the capabilities of typical non-optical commercial, structural-grade strain gauge systems, where even tens of microstrain are tolerated in some situations. Finally, cross-talk between sensor gratings is not present, as is shown in FIG. 5, where a small-amplitude (12 με) strain signal was placed on one grating (the one with the larger signal in FIG. 5) only with a piezoelectric oscillator, but the signal does not appear on the other gratings (the other signals in FIG. 5).

Figure 6:
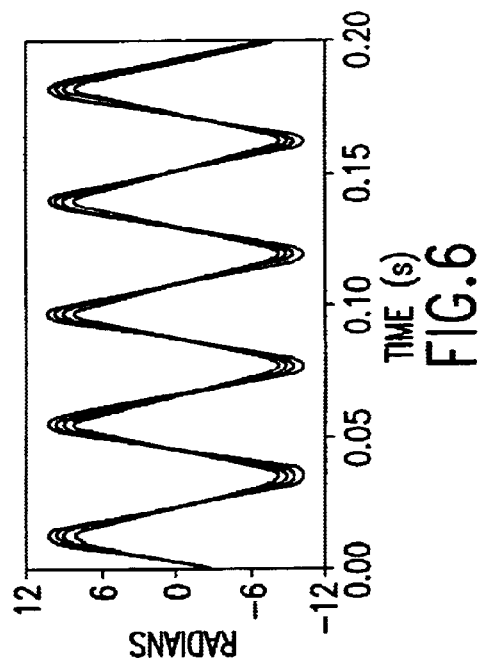
FIG. 6 demonstrates the large-amplitude signal phase unwrapping capability of the present invention. The channels are intentionally shifted for visual clarity.
Figure 7:
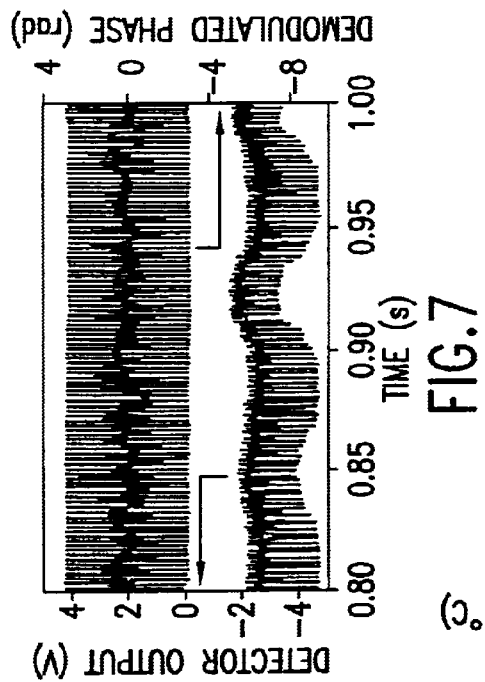
FIG. 7 demonstrates the demodulator's insensitivity to source intensity fluctuations according to the present invention.

Results demonstrating the performance of the demodulation scheme are shown in FIGS. 6 and 7. In FIG. 6, a large-amplitude signal of just less than 4π rad (almost 900με) is applied to the whole grating array 326, and the figure shows that the inverse tangent calculation is performed continuously across the unit circle and that phase unwrapping beyond the unit circle is maintained properly. FIG. 7 shows the result when a signal is applied to a grating in the grating array 326 while the source light 320 is modulated manually. FIG. 7 clearly indicates that although the voltage at the peak detectors 354, 356 and 358 (one of the three is shown in the bottom trace) is fluctuating, the resulting demodulated signal (the top trace) remains stationary.

Several tests were also performed to test the effectiveness of the interferometer 340 drift compensation technique. A single sensor grating 326A of the grating array 326 was used in the device, and both the interferometer 340 and the reference grating system 324 were subject to various test conditions. The test conditions, particularly with regard to the induced thermal fluctuations, were chosen to exceed conditions which may be encountered in a challenging field application.

Figure 8:
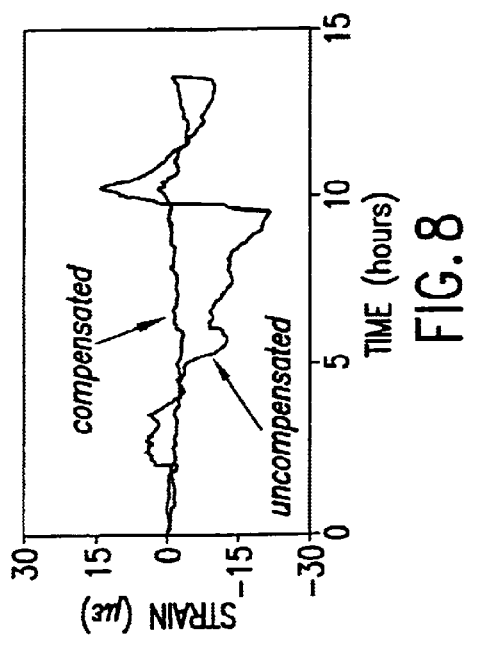
FIG. 8 demonstrates interferometer drift compensation in a laboratory environment under normal operating conditions according to the present invention.

The first test was carried out by acoustically isolating both the interferometer 340 and the reference system 324 and placing the sensor FBG 326A in a thermal chamber held at 30° C. for 14 hours. The room temperature was observed to change approximately ±2° C. over the test length, and the results are shown in FIG. 8. Both the 'raw', uncompensated recovered FBG strain and the compensated strain are shown in comparison. A typical FBG 326A has a thermal sensitivity of approximately 10με° $C.^{-1}$. Given that the thermal fluctuations in the chamber are of the order of a few tenth of 1° C., a compensated drift of the order of 1με or so is expected, and the figure confirms this expectation. The uncompensated data, on the other hand, demonstrate a 40με peak to peak fluctuation that would otherwise be falsely interpreted as mechanical strain.

Figure 9:
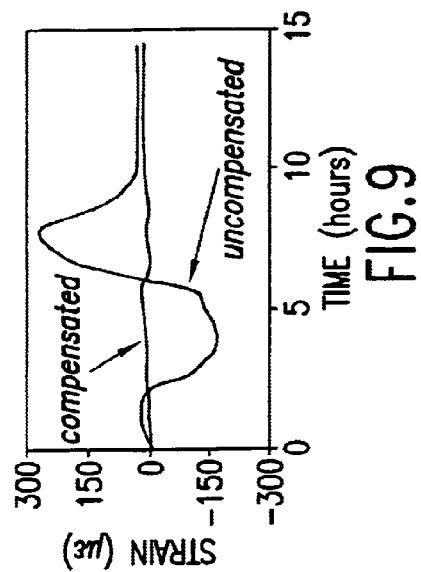
FIG. 9 demonstrates interferometer drift compensation when the interferometer is subject to thermal cycling between 10° C. and 40° C. over 14 hours according to the present invention.

The second test was carried out by thermally solely loading the interferometer 340 between 10° C. and 40° C. while holding the reference system 324 at 0° C. The test results are shown in FIG. 9. The uncompensated false mechanical strain signal approached 300 με, while the maximum error in the compensated signal reached only 19.3 με, representing less than 0.4% of full scale.

Figure 10:
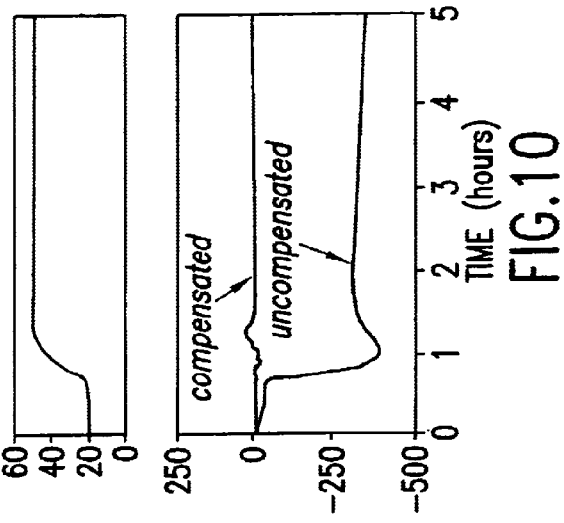
FIG. 10 demonstrates interferometer drift compensation when both the interferometer and the reference system are subject to rapid heating from 20° C. to 50° C. in less than 1 hour according to the present invention.

In the final test, both the interferometer 340 and the reference system 324 were subject to rapid thermal cycling from 20° C. to 50° C. over less than 1 hour, and the results are shown in FIG. 10. The top trace represents the temperature as measured by $\Delta\phi_G$ and $\Delta\phi_{Al}$ in accordance with the simultaneous solution of equations (2). The uncompensated signal deviated by almost 400 με, while the maximum error in the compensated signal was 33 με, or about 0.6% of full scale. The largest error in the compensated signal occurred during the most rapid rise of the temperature in the first hour of the test, and the most likely source of error here is the mismatch in thermal inertias of the glass and aluminum substrates to which the reference gratings 324A and 324B were bonded. The present reference algorithm does not account for thermal dynamic effects such as thermal inertia, and future materials selection should include the matching of thermal masses (conductivities) in the substrates used. This conclusion is supported by the fact that once the temperature stabilized after the first hour, the maximum compensated error was only 13με, so it is likely that the temperatures were being miscalculated during the transient portion of the test. A summary of these drift compensation tests and the results is presented in table 1.

TABLE 1

A summary of conditions used to test the interferometer drift compensation technique. The asterisk (*) denotes that this maximum error is a transient error occurring during the rapid heating process.

| Time (hours) | Interferometer temperature (C.) | Reference Temperature | Max. drift strain ($\mu\epsilon$) | Compensated strain ave. ($\mu\epsilon$) | Max error and % of full scale |
|---|---|---|---|---|---|
| 14 | ambient (room) | ambient (room) | 39 | −0.7 | 4.7 $\mu\epsilon$ 0.09% |
| 14 | 25–40–10–25 | 0 | 450 | 11 | 19.3 $\mu\epsilon$, 0.39% |
| 5 | 20–50 | 20–5 | 400 | 13 | 33 $\mu\epsilon$*, 0.66% |

In conclusion, the interrogation system and optical sensor device of the present invention have many advantages. Table 2 summarizes some of the advantages of the present invention over the conventional interrogation system and sensors made therefrom.

TABLE 2

Summary of typical performance characteristics for various grating-based interrogation system architectures.

| Metric | System architecture | | |
|---|---|---|---|
| | Scanning Fabry-Perot | WDM Interferometry | The present invention |
| Dynamic resolution (n$\epsilon$Hz$^{-½}$) | 100 | 5–10 | <5 |
| Dynamic range (dB) | 94 | 108 | 114 |
| Frequency bandwidth (Hz) | quasi-static-360 | 100–40,000 | quasi-static-20,000 |
| Multiplexing capability | 16 | 4–8 | >16 |

The foregoing detailed description of the invention and examples are not intended to limit the scope of the invention in any way and should not be construed as limiting the scope of the invention. The scope of the invention is to be determined from the claims appended hereto.

We claim:

1. A device for measuring a change in an environment comprising:
    a first optical fiber having a plurality of fiber Bragg gratings, wherein each of the fiber Bragg gratings has a different predetermined reflection wavelength;
    a broadband light source optically coupled to the optical fiber;
    a scanning filter optically coupled to the optical fiber;
    an interferometer optically coupled to the scanning filter;
    a first photodetector generating a first output, wherein the first photodetector is optically coupled to the interferometer;
    a second photodetector generating a second output, wherein the second photodetector is optically coupled to the interferometer; and
    a third photodetector generating a third output, wherein the third photodetector is optically coupled to the interferometer.

2. A device as claimed in claim 1 further comprising:
    a demodulation unit connected to the first, second and third photodetectors for processing the first output from the first photodetector and the second output from the second photodetector and generating a measurement of the change in the environment.

3. A device as claimed in claim 2, wherein the demodulation unit further comprises
    means for computing a tangent of a phase of a phase signal using the outputs from the photodetectors;
    means for computing an arctangent of the tangent of the phase of the phase signal; and
    means for phase-unwrapping the arctangent.

4. A device as claimed in claim 3, wherein the means for computing the tangent, the means for computing the arctangent and the means for phase-unwrapping are encoded on a programmable chip.

5. A device as claimed in claim 3, wherein the means for computing the tangent, the means for computing the arctangent and the means for phase-unwrapping are programs residing in a computer.

6. A device as claimed in claim 3, wherein each of the means for computing the tangent, the means for computing the arctangent and the means for phase-unwrapping is an encoded chip.

7. A device as claimed in claim 1, wherein the broadband light source and the scanning filter are optically coupled to the first optical fiber via a first 2×2 coupler.

8. A device as claimed in claim 7 further comprising a second optical fiber having at least one unattached fiber Bragg grating, wherein the second optical fiber is optically coupled to the broadband light source and the scanning filter via the first 2×2 coupler, wherein the at least one unattached fiber Bragg grating is isolated from the environment, and wherein the at least one unattached fiber Bragg grating experiences a temperature variation which is the same as the fiber Bragg gratings of the first optical fiber.

9. A device as claimed in claim 1 further comprising a fourth photodetector, wherein the interferometer is optically coupled to the scanning filter through a splitter and a 2×2 coupler, wherein the splitter and the 2×2 coupler are optically coupled, and wherein the fourth photodetector is optically coupled to the splitter and generates a fourth output.

10. A device as claimed in claim 9 further comprising:
    a first peak detector connected to the first photodetector and generating a first peak signal upon receiving the first output from the first photodetector;
    a second peak detector connected to the second photodetector and generating a second peak signal upon receiving the second output from the second photodetector; and
    a third peak detector connected to the third photodetector and generating a third peak signal upon receiving the third output from the third photodetector;
    an A/D board connected to the first, second and third peak detectors and receiving the first, second, and third peak signals from the first, second and third peak detectors respectively;
    a first comparator which receives the fourth output from the fourth photodetector and a predetermined voltage, wherein the first comparator is connected to the A/D board and a one-shot circuit which is further connected to the first, second and third peak detectors, whereby upon the fourth output of the fourth photodetector falling below the a predetermined voltage, the first comparator triggers the one-shot circuit to reset the first, second and third peak detectors and allows the A/D board to star converting the first, second and third peak signals into digital signals with a built-in delay.

11. A device as claimed in claim 1, wherein the scanning filter is a scanning Fabry-Perot filter having a passband wavelength, the passband wavelength being controlled by a triangular voltage wave.

12. A device as claimed in claim 1, wherein the interferometer is a Mach-Zehnder interferometer comprising a first optical path and a second optical path.

13. A device as claimed in claim 1, wherein the interferometer is optically coupled to the first, second and third photodetectors through a 3×3 coupler.

14. An interrogating system for a fiber optical sensor having fiber Bragg gratings comprising:
   a scanning filter optically coupled to the fiber optical sensor;
   an interferometer optically coupled to an output port of the scanning filter;
   a first photodetector optically coupled to the interferometer;
   a second photodetector optically coupled to the interferometer; and
   a third photodetector optically coupled to the interferometer.

15. An interrogation system as claimed in claim 14, further comprising a 3×3 coupler, wherein the interferometer is optically coupled to the first, second and third photodetectors through the 3×3 coupler.

16. An interrogation system as claimed in claim 14, wherein the interferometer comprises two optical paths having different optical lengths.

17. An interrogation system as claimed in claim 16, wherein a difference in optical length between the two optical paths is about 2.75 mm.

18. An interrogation system as claimed in claim 14, wherein the scanning filter is a tunable Fabry-Perot filter having a passband wavelength which is regulated through a triangular voltage wave.

19. A method for measuring a change in an environment comprising the steps of:
   irradiating a fiber having a plurality of fiber Bragg gratings with different center wavelengths with a broadband light to generate a reflected light from each of the Bragg gratings, wherein each of the reflected lights is reflected from a specific fiber Bragg grating and has a wavelength which is the sum of the center wavelength characteristic of the specific fiber Bragg grating and a wavelength shift based on the change in the environment;
   filtering one of the reflected lights through a scanning filter at a time;
   encoding the wavelength of the reflected light from the scanning filter into a phase signal embedded in at least three interference lights using an interferometer;
   converting the at least three interference lights into at least three voltage signals using at least three photodetectors;
   demodulating the at least three voltage signals to obtain the phase of the phase signal;
   calculating the wavelength shift of the reflected light from the phase of the phase signal; and
   determining the change in the environment from the wavelength shift.

20. A method as claimed in claim 19, wherein the scanning filter is a tunable Fabry-Perot filter having a passband wavelength regulated by a triangular voltage wave.

21. A method as claimed in claim 19, wherein the interferometer comprises two optical paths with different optical lengths.

22. A method as claimed in claim 19, wherein the demodulating step is carried out using a demodulator comprising:
   means for computing a tangent of a phase of the transmitted lights using the voltage signals;
   means for computing an arctangent of the tangent of the phase of the reflected light; and
   means for phase-unwrapping the arctangent to obtain the phase of the reflected light.

23. A method as claimed in claim 22, wherein the means for computing the tangent, the means for computing the arctangent and the means for phase-unwrapping are encoded on a programmable chip.

24. A method as claimed in claim 22, wherein the means for computing the tangent, the means for computing the arctangent and the means for phase-unwrapping are programs residing in a computer.

25. A method as claimed in claim 22, wherein each of the means for computing the tangent, the means for computing the arctangent and the means for phase-unwrapping is an encoded chip.

* * * * *